(12) United States Patent
Yang et al.

(10) Patent No.: US 11,359,977 B2
(45) Date of Patent: Jun. 14, 2022

(54) HIGH-SENSITIVITY HIGH-TEMPERATURE SENSOR BASED ON DISLOCATION WELDING OF SUSPENDED OPTICAL FIBER

(71) Applicant: Guangdong Ocean University, Zhanjiang (CN)

(72) Inventors: Yuqiang Yang, Zhanjiang (CN); Xiaoguang Mu, Zhanjiang (CN); Ji Wang, Zhanjiang (CN); Wenhu Yang, Zhanjiang (CN); Lei Bi, Zhanjiang (CN)

(73) Assignee: GUANGDONG OCEAN UNIVERSITY, Zhanjiang (CN)

( * ) Notice: Subject to any disclaimer, the term of this patent is extended or adjusted under 35 U.S.C. 154(b) by 0 days.

(21) Appl. No.: 17/581,053

(22) Filed: Jan. 21, 2022

(65) Prior Publication Data

US 2022/0146331 A1 May 12, 2022

Related U.S. Application Data

(63) Continuation of application No. PCT/CN2021/126961, filed on Oct. 28, 2020.

(30) Foreign Application Priority Data

Jan. 26, 2021 (CN) .......................... 202110103697.5

(51) Int. Cl.
*G01K 11/32* (2021.01)
*G02B 6/028* (2006.01)

(52) U.S. Cl.
CPC ............ *G01K 11/32* (2013.01); *G02B 6/0288* (2013.01)

(58) Field of Classification Search
None
See application file for complete search history.

(56) References Cited

U.S. PATENT DOCUMENTS 10,520,355 B1 * 12/2019 Han ........................ G01H 9/004

OTHER PUBLICATIONS

Fu Haiwei, Yan Xu, Li Huidong, Zhao Na "Optical fiber core-mismatched Mach-Zehnder refractive sensor", Optical precision engineering, Sep. 2014, pp. 2285-2291, vol. 22 No. 9.
Zhang Yufeng "Study on sensing characteristics of interferometric fiber sensor and suspended core microstructure fiber grating", Chinese excellent master's thesis full text database information technology series, 2017, No. 3, I140-663.

* cited by examiner

*Primary Examiner* — John Bedtelyon
(74) *Attorney, Agent, or Firm* — WPAT, PC

(57) ABSTRACT

A high-sensitivity high-temperature sensor based on dislocation welding of suspended optical fiber is provided and includes a broadband light source, an optical fiber circulator, a sensing head and a spectrometer. The optical fiber circulator is connected to the broadband light source, the sensing head and the spectrometer individually, the sensing head includes a first single-mode optical fiber, a multi-mode optical fiber, a suspended core optical fiber and a second single-mode optical fiber which are connected in sequence. The high-sensitivity high-temperature sensor has the following advantages: simple to manufacture, no need for expensive special equipment; small sizes, compact structure, easy to use; full optical fiber structure, which can measure high temperatures up to 1000 degrees; no need for adhesive, good sensor stability; double cavities in parallel can generate vernier effects with high sensitivity.

3 Claims, 4 Drawing Sheets

HIGH-SENSITIVITY HIGH-TEMPERATURE SENSOR BASED ON DISLOCATION WELDING OF SUSPENDED OPTICAL FIBER

TECHNICAL FIELD

The invention relates to the technical field of optical fiber sensing, and in particular to a high-sensitivity high-temperature sensor based on dislocation welding of suspended optical fiber.

BACKGROUND

High-temperature sensor has always been an important research direction of researchers in various countries, it is widely applied in aerospace, petrochemical industry, marine engineering and other fields, and is the frontier technology related to national advanced equipment manufacturing. However, due to the complex and harsh application environment, not only the sensor material is required to withstand high temperatures, but also good stability and accuracy of work in the high temperature environment must be ensured. Optical fiber sensors have been the research hotspot in this field because of its safety, small sizes, high sensing accuracy, anti-electromagnetic interference, easy networking and high temperature resistance of materials. Optical fiber temperature sensor is mainly designed by optical fiber grating and optical fiber microcavity. The development of optical fiber grating is relatively mature, and it has been used in all walks of life. However, when the optical fiber grating is in the temperature of above 300° C., the grating will decay or disappear, which seriously affects its performance. The performance of optical fiber microcavity depends on the surface shape of its two reflecting surfaces, and the performance will not change if the surface shape is unchanged, so its measurable temperature can reach 1100° C., which is close to the melting point of silica. However, due to the short length of optical fiber microcavity (usually 50-400 μm), its temperature sensitivity is low, usually lower than 10 pm/° C.

SUMMARY

Aiming at the above technical problems, the invention provides a high-sensitivity high-temperature sensor based on dislocation welding of suspended optical fiber, which can measure the high temperature of 1100° C., and its sensitivity is improved by one order of magnitude compared with that of a single optical fiber microcavity (such as Fabry-Pérot interferometer) by using the double-cavity vernier effect.

In order to achieve the above objective, the invention provides the following scheme: the invention provides a high-sensitivity high-temperature sensor based on the dislocation welding of suspended optical fiber, which includes a broadband light source, an optical fiber circulator, a sensing head and a spectrometer;

the optical fiber circulator is connected to the broadband light source, the sensing head and the spectrometer individually;

the sensing head includes a first single-mode optical fiber, a multi-mode optical fiber, a suspended core optical fiber and a second single-mode optical fiber which are sequentially connected;

the first single-mode optical fiber includes a first fiber core;

the multi-mode optical fiber includes a second fiber core;

the suspended core optical fiber includes a third fiber core and a first air hole;

the second single-mode optical fiber includes a fourth fiber core;

the first single-mode optical fiber and the multi-mode optical fiber are welded core-to-core;

the first fiber core and the second fiber core are connected core-to-core.

In an embodiment, the wave band of the broadband light source is 1200 nanometers (nm)-1600 nm.

In an embodiment, the optical fiber circulator includes a first end of the optical fiber circulator, a second end of the optical fiber circulator and a third end of the optical fiber circulator;

the first end of the optical fiber circulator is connected with the broadband light source;

the second end of the optical fiber circulator is connected with the sensing head;

the third end of the optical fiber circulator is connected with the spectrometer;

the broadband light source transmits the wave band signal to the sensing head for processing through the first end of the optical fiber circulator;

the sensing head transmits the processed wave band signal to the spectrometer through the second end of the optical fiber circulator.

In an embodiment, the length of the multi-mode optical fiber is 50-150 micrometers (μm).

In an embodiment, the multi-mode optical fiber and the suspended core optical fiber are welded in a dislocation manner, and the dislocation length is 10-30 μm; the second fiber core is connected with the third fiber core and the first air hole.

In an embodiment, the length of the suspended core optical fiber is 200-300 μm.

In an embodiment, the suspended core optical fiber and the second single-mode optical fiber are welded in a dislocation manner; the third fiber core is connected with the fourth fiber core.

In an embodiment, the lengths of the third fiber core and the fourth fiber core satisfy that the sum of the transmission optical paths of incident light in the third fiber core and the fourth fiber core is 1.90-1.99 times or 2.01-2.10 times of an transmission optical path of the incident light in the first air hole.

The invention discloses the following technical effects:

The invention adopts the optical fiber welding preparation method, which has the following advantages: simple to manufacture, no need for expensive special equipment; small size, compact structure, easy to use; full optical fibre structure, which can measure high temperatures up to 1000° C.; no need for adhesive, good sensor stability; double cavities in parallel can generate vernier effect with high sensitivity.

BRIEF DESCRIPTION OF THE FIGURES

In order to more clearly explain the embodiments of the invention or the technical solutions in the prior art, the drawings needed in the embodiments will be briefly introduced below. Obviously, the drawings in the following description are only some embodiments of the invention, and for those skilled in the art, other drawings can be obtained according to these drawings without paying creative efforts.

FIGS. 3A to 3C are schematic cross-sectional views of the optical fiber of the invention, in which: FIG. 3A is a schematic cross-sectional view of the first single-mode optical fiber and the second single-mode optical fiber, FIG. 3B is a schematic cross-sectional view of the multi-mode optical fiber and FIG. 3C is a schematic cross-sectional view of the suspended core optical fiber;

FIG. 5A and FIG. 5B are schematic diagrams of the vernier effect generated by an embodiment of the invention; in which: FIG. 5A shows the spectrum shift of silica cavity, and FIG. 5B shows the spectrum shift of the envelope.

DETAILED DESCRIPTION OF THE EMBODIMENTS

Next, the technical solutions in the embodiments of the invention will be clearly and completely described with reference to the drawings in the embodiments of the invention. Obviously, the described embodiments are only part of the embodiments of the invention, not all of them. Based on the embodiments in the invention, all other embodiments obtained by those skilled in the art without creative efforts are within the scope of the invention.

In order to make the above-mentioned objectives, features and advantages of the invention more obvious and easier to understand, the invention will be described in further detail below with reference to the drawings and detailed description.

Figure 1:
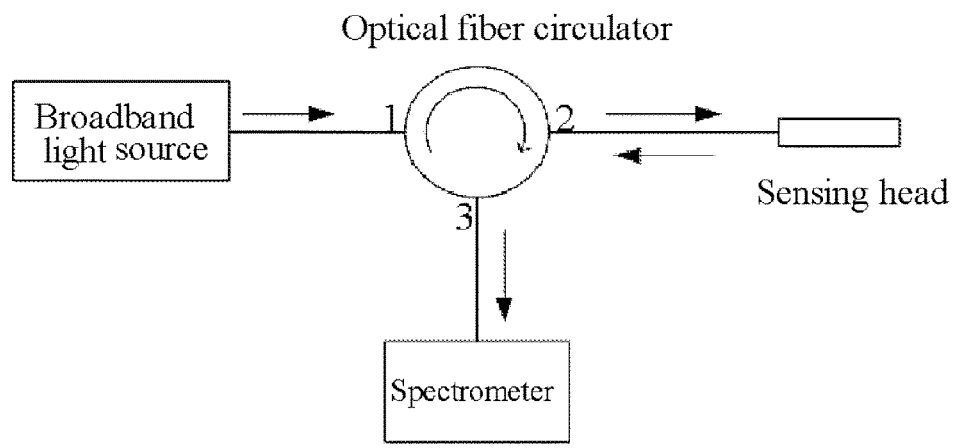
FIG. 1 is a schematic structural diagram of the sensor of the invention.
Figure 2:
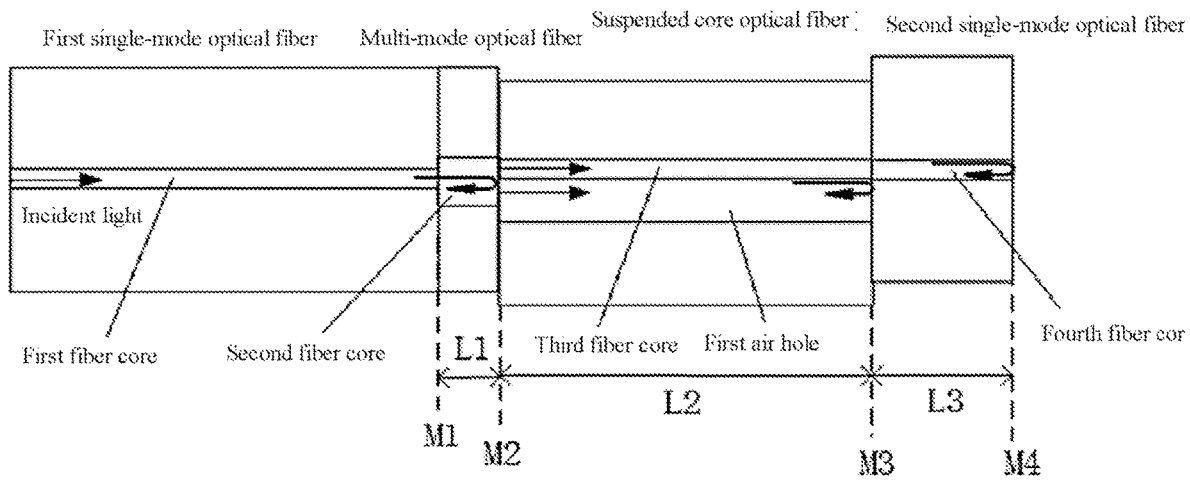
FIG. 2 is a schematic structural diagram of the sensing head of the invention.

As shown in FIG. 1, the invention provides a high-sensitivity high-temperature sensor based on dislocation welding of suspended optical fiber, which includes a broadband light source, an optical fiber circulator, a sensing head and a spectrometer.

the optical fiber circulator is connected to the broadband light source, the sensing head and the spectrometer individually;

the optical fiber circulator includes a first end of the optical fiber circulator, a second end of the optical fiber circulator and a third end of the optical fiber circulator; the first end of the optical fiber circulator is connected with the broadband light source; the second end of the optical fiber circulator is connected with the sensing head; the third end of the optical fiber circulator is connected with the spectrometer;

the broadband light source transmits the wave band signal to the sensing head for processing through the first end of the optical fiber circulator;

As shown in FIG. 2, the sensing head transmits the processed wave band signal to the spectrometer through the second end of the optical fiber circulator. The sensing head includes a first single-mode optical fiber, a multi-mode optical fiber, a suspended core optical fiber and a second single-mode optical fiber which are connected in sequence. The first single-mode optical fiber includes a first fiber core; the multi-mode optical fiber includes a second fiber core; the suspended core optical fiber includes a third fiber core and a first air hole; the second single-mode optical fiber includes a fourth fiber core.

Figure 3A:
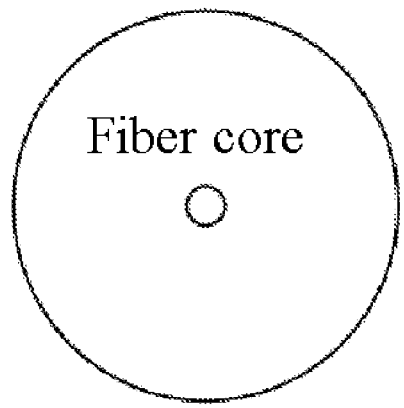
Figure 3B:
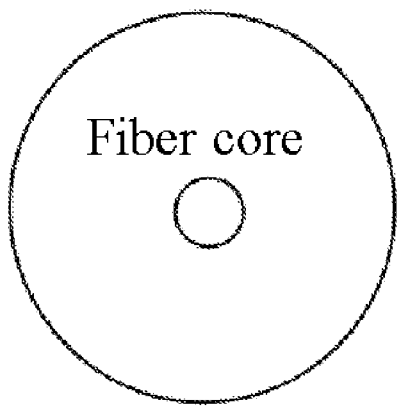
Figure 3C:
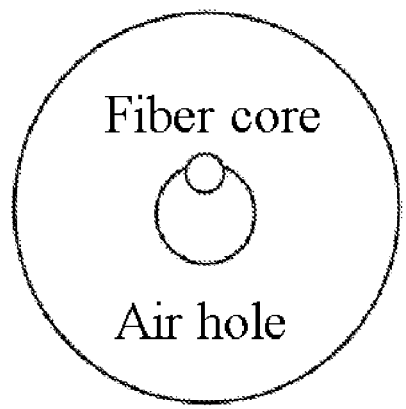

The cross sections of several kinds of optical fibers are shown in FIG. 3A-FIG. 3C. The outer diameters of the first single-mode optical fiber, the second single-mode optical fiber, the multi-mode optical fiber and the suspended core optical fiber each are 125 µm; the fiber core diameters of the first single-mode optical fiber, the second single-mode optical fiber and the suspended core optical fiber each are 10 µm; the fiber core diameter of the multi-mode optical fiber is 30-50 µm; the first air hole of the suspended core optical fiber is located at the center of the cross section and with a diameter of 50 µm, and the third fiber core of the suspended core optical fiber is located at the edge of the first air hole, partially exposed to the air.

The manufacturing process of the sensing head is as follows:

Welding the first single-mode optical fiber with the multi-mode optical fiber core-to-core, and then cutting the multi-mode optical fiber into the length of 50-150 µm;

Welding the cutting end of the multi-mode optical fiber with the suspended core optical fiber in a dislocation manner with the dislocation length of 10-30 µm to ensure that the fiber core and air holes of the suspended core optical fiber are partially overlapped with the fiber core of the multi-mode optical fiber, so that one part of the incident light enters the fiber core of the suspended core optical fiber and the other part of the incident light enters the air holes of the suspended core optical fiber, and then cutting the suspended core optical fiber with a length of 200-300 µm;

The cut suspended core optical fiber and the second single-mode optical fiber are welded in a dislocation manner. The fiber core of the suspended core optical fiber overlaps with the fiber core of the second single-mode optical fiber after the dislocation welding. Then the second single-mode optical fiber is cut, the length of which is determined by the length of the suspended core optical fiber, so as to meet the requirement that the sum of optical paths of the incident light transmitted in the core of the suspended core optical fiber and the core of the second single-mode optical fiber is about 1.90-1.99 times or 2.01-2.10 times of an optical path of the incident light transmitted in the air hole of the suspended core optical fiber, so as to ensure the vernier effect.

The incident light enters the multi-mode optical fiber from the first single-mode optical fiber and expands the beam in the multi-mode optical fiber (the function of the multi-mode optical fiber is to reduce the precision requirement of the dislocation length during the dislocation welding of the suspended core optical fiber); part of the incident light is reflected by the interface M2 formed by the multi-mode optical fiber and the air hole of the suspended core optical fiber, and is received by the spectrometer after passing through the optical fibre coupler, while the other part of the light enters the suspended core optical fiber; the incident light entering the suspended core optical fiber is divided into two beams in the suspended core optical fiber, one beam is transmitted in the fiber core and the other beam is transmitted in the air hole. The light beam transmitted in the suspended fiber core enters the fiber core of the second single-mode optical fiber, and then a part of the light is reflected back to the sensing head by the interface M4, and then received by the spectrometer after passing through the optical fiber circulator; part of the light beam transmitted in the air hole of the suspension core is reflected back to the sensing head by the interface M3 formed by the air hole of the suspended core optical fiber and the second single-mode optical fiber, and then received by the spectrometer through the optical fibre coupler. Therefore, interfaces M2 and M3 constitute an air cavity, and interfaces M2 and M4 constitute a silica cavity. The interference spectra of the above two cavities are respectively expressed as:

$$\begin{cases} I_{air}(\lambda) = 2AB \cos\left(\dfrac{4n_{air}\pi L_2}{\lambda}\right) \\ I_{silica}(\lambda) = 2AC \cos\left(\dfrac{4n_{silica}\pi(L_2 + L_3)}{\lambda}\right) \end{cases} \quad (1)$$

Where $\lambda$ is the wavelength of incident light; $I_{air}(\lambda)$ and $I_{silica}(\lambda)$ represent the interference spectra of air cavity and silica cavity respectively. A, B and C are the complex amplitudes of reflected light reflected back to the spectrometer by interfaces M2, M3 and M4, respectively; $L_2$, $L_2+L_3$ are the lengths of the air cavity and the silica cavity respectively; $n_{air}$ and $n_{silica}$ are the refractive index of air cavity and silica cavity, respectively.

The air cavity and the silica cavity form a parallel structure, and the spectrum received by the spectrometer is the superposition of interference spectra of the air cavity and the silica cavity, which is expressed as:

$$I_{all}(\lambda) = I_{air}(\lambda) + I_{silica}(\lambda) \quad (2)$$

Figure 4:
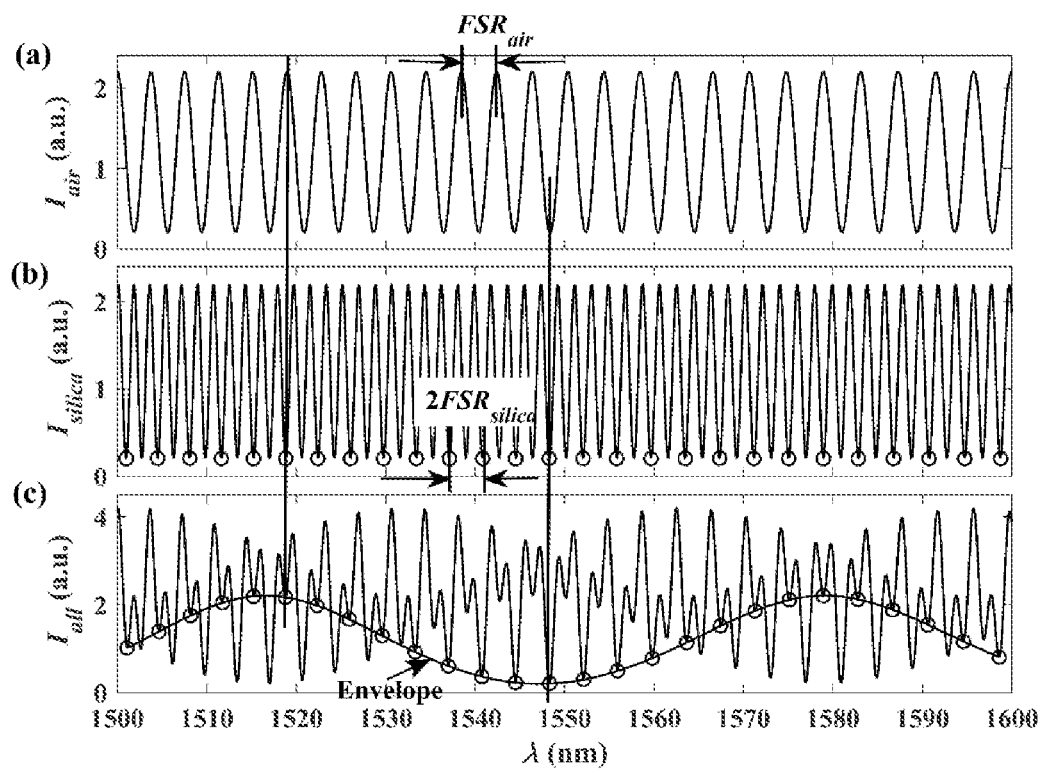
FIG. 4 are schematic diagrams of interference spectrum envelopes generated in embodiments of the invention, in which: (a) is an air cavity interference spectrum, (b) is a silica cavity interference spectrum, and (c) is a parallel interference spectrum.

When the length optical path $n_{silica}(L_2+L_3)$ of the silica cavity is about twice the optical path $n_{air}L_2$ of the air cavity, but not equal to twice (that is, the free spectral range of the air cavity $FSR_{air}$ is about twice the free spectral range of the silica cavity $FSR_{silica}$, but not equal to twice), the interference spectrum of the parallel double cavities will generate an envelope, as shown in FIG. 4, and the envelope can be expressed as:

$$I_{envelope}(\lambda) = D\cos\left(\dfrac{4\pi n_{air} L_2}{M\lambda}\right) \quad (3)$$

$$M = \dfrac{2n_{air}L_2}{n_{silica}(L_2+L_3)_{-2}n_{air}L_2} \quad (4)$$

Figure 5A:
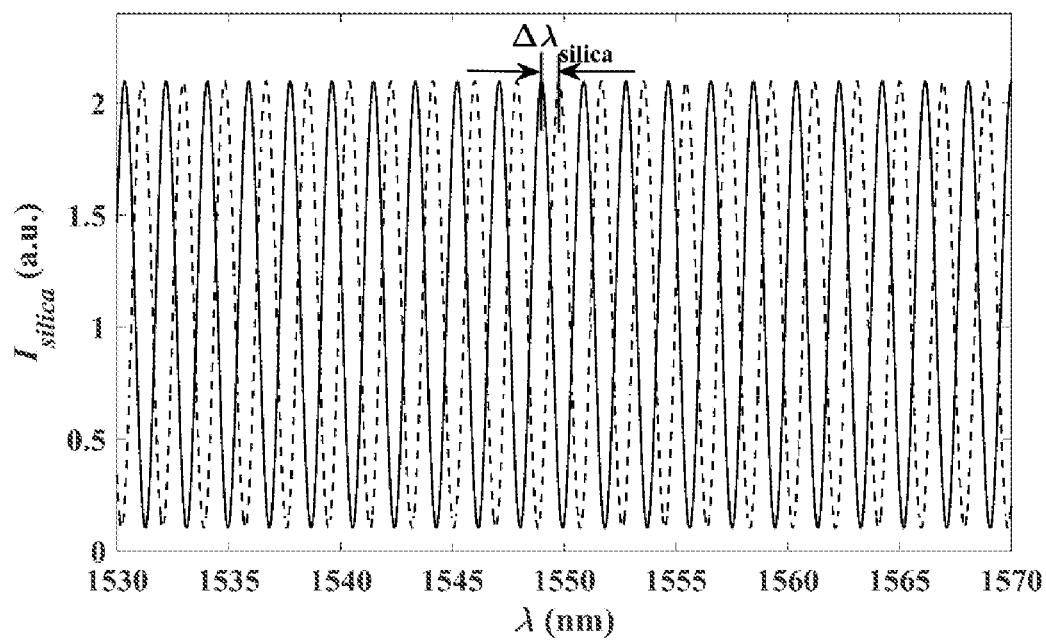
Figure 5B:
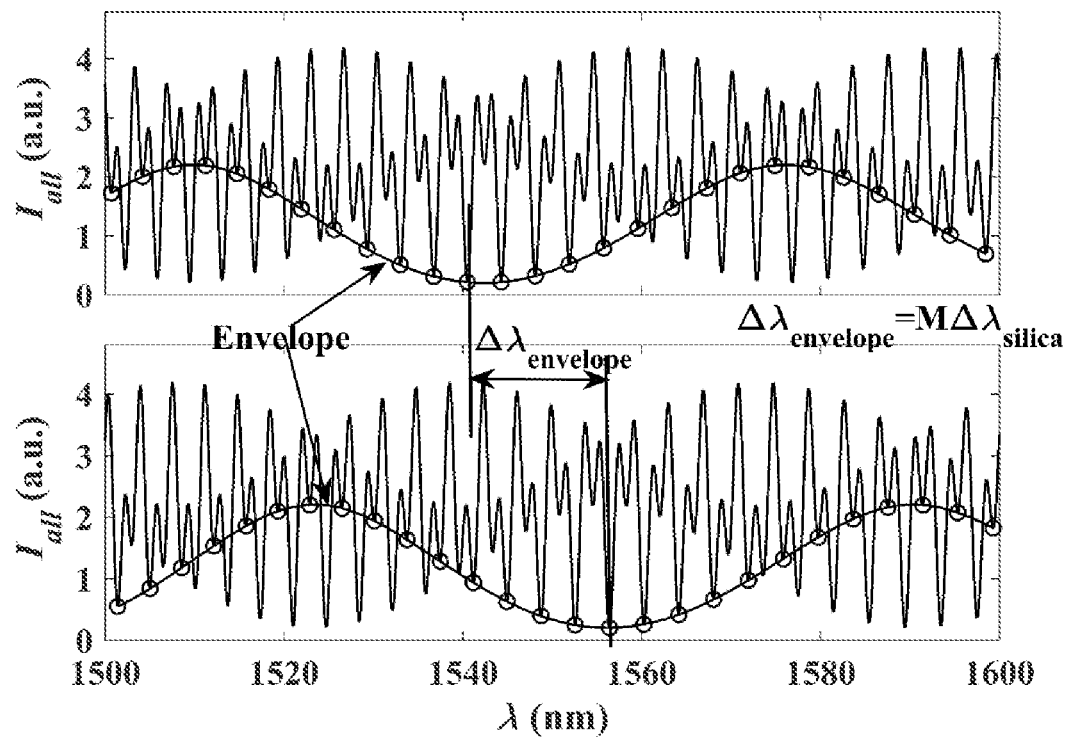

In which: M is the amplification factor. Because the thermo-optical coefficient of optical fiber is one order of magnitude higher than the thermal expansion coefficient (the thermo-optical coefficient of optical fiber is about $6.7\times10^{-6}/°$ C., the thermal expansion coefficient of optical fiber is about $0.55\times10^{-6}/°$ C.), and the thermo-optical coefficient of air is much lower than that of silica (the thermo-optical coefficient of air is about $5.6\times10^{-7}/°$ C.). Therefore, when the temperature changes, the thermal expansion of optical fiber and the thermo-optical effect of air can be ignored, and only the thermo-optical effect of optical fiber can be considered. When the temperature changes, the interference spectrum of the air cavity will not change, but the interference spectrum of the silica cavity will shift. Moreover, because the free spectrum range of silica cavity is about 2 times that of air cavity, but not equal to 2 times, the parallel interference spectrum of double cavities will generate vernier effect at this time, that is, when the interference spectrum of silica cavity shifts under the action of temperature, the shift amount of interference spectrum envelope is M times that of a single silica cavity, as shown in FIG. 5A and FIG. 5B.

Temperature sensitivity $S_{silica}$ of a single silica cavity can be expressed as:

$$S_{silica} = \dfrac{d\lambda}{dT} = \dfrac{\alpha\lambda_m}{n_{silica}} \quad (5)$$

Wherein $\alpha$ is the thermo-optical coefficient of the optical fiber; $\lambda_m$ is the peak wavelength.

Temperature sensitivity $S_{envelope}$ of parallel double-cavity sensor can be expressed as:

$$S_{envelope} = \dfrac{M\alpha\lambda_m}{n_{silica}} \quad (6)$$

The temperature sensitivity after double cavities in parallel is M times that of a single silica cavity. Assuming that the peak wavelength is $\lambda_m=1550$ nm, silica refractive index $n_{silica}=1.45$, magnification M=50, and thermal-optical coefficient of optical fiber $\alpha=6.7\times10^{-6}/°$ C., the temperature sensitivity of a single silica cavity is 7 pm/° C., and that of a parallel double-cavity sensor is 350 pm/° C.

The above-mentioned embodiments are only a description of preferred modes of the invention, and does not limit the scope of the invention. Without departing from the design spirit of the invention, all kinds of modifications and improvements made by those skilled in the art to the technical scheme of the invention should fall within the scope of protection defined by the appended claims of the invention.

What is claimed is:

1. A high-sensitivity high-temperature sensor based on dislocation welding of suspended optical fiber, comprising a broadband light source, an optical fiber circulator, a sensing head and a spectrometer;
   wherein the optical fiber circulator is connected to the broadband light source, the sensing head and the spectrometer individually;
   wherein the sensing head comprises a first single-mode optical fiber, a multi-mode optical fiber, a suspended core optical fiber and a second single-mode optical fiber sequentially connected in that order;
   wherein the first single-mode optical fiber comprises a first fiber core, the multi-mode optical fiber comprises a second fiber core, the suspended core optical fiber comprises a third fiber core and a first air hole, and the second single-mode optical fiber comprises a fourth fiber core;
   wherein the first single-mode optical fiber and the multi-mode optical fiber are welded core-to-core, and the first fiber core and the second fiber core are connected core-to-core;
   wherein the multi-mode optical fiber and the suspended core optical fiber are welded in a dislocation manner, and a dislocation length is in a range from 10 micrometers ($\mu$m) to 30 $\mu$m;
   wherein the second fiber core is connected to the third fiber core and the first air hole;
   wherein a length of the suspended core optical fiber is in a range from 200 $\mu$m to 300 $\mu$m;
   wherein the suspended core optical fiber and the second single-mode optical fiber are welded in a dislocation manner;
   wherein outer diameters of the first single-mode optical fiber, the second single-mode optical fiber, the multi-mode optical fiber and the suspended core optical fiber each are 125 $\mu$m, fiber core diameters of the first single-mode optical fiber, the second single-mode optical fiber and the suspended core optical fiber each are 10 $\mu$m, a fiber core diameter of the multi-mode optical fiber is in a range from 30 $\mu$m to 50 $\mu$m, the first air hole of the suspended core optical fiber is located at a center of a cross section of the suspended core optical fiber and with a diameter of 50 $\mu$m, and the third fiber core of the suspended core optical fiber is located at an edge of the first air hole and partially exposed to air;

wherein the third fiber core is connected to the fourth fiber core, and the third fiber core coincides with the fourth fiber core;

wherein lengths of the third fiber core and the fourth fiber core satisfy that a sum of transmission optical paths of an incident light transmitted in the third fiber core and the fourth fiber core is 1.90-1.99 times or 2.01-2.10 times of a transmission optical path of the incident light transmitted in the first air hole;

wherein the optical fiber circulator comprises a first end of the optical fiber circulator, a second end of the optical fiber circulator and a third end of the optical fiber circulator; and wherein the first end of the optical fiber circulator is connected to the broadband light source, the second end of the optical fiber circulator is connected to the sensing head, the third end of the optical fiber circulator is connected to the spectrometer, the broadband light source is configured to transmit a wave band signal to the sensing head for processing through the first end of the optical fiber circulator, and the sensing head is configured to transmit the wave band signal after the processing to the spectrometer through the second end of the optical fiber circulator.

2. The high-sensitivity high-temperature sensor based on dislocation welding of suspended optical fiber according to claim 1, wherein a wave band of the broadband light source is in a range from 1200 nanometers (nm) to 1600 nm.

3. The high-sensitivity high-temperature sensor based on dislocation welding of suspended optical fiber according to claim 1, wherein a length of the multi-mode optical fiber is in a range from 50 μm to 150 μm.

* * * * *